(12) United States Patent
Kirchner et al.

(10) Patent No.: US 11,569,736 B2
(45) Date of Patent: Jan. 31, 2023

(54) SELF-ADJUSTING DC/DC CONVERTER SOFT-START MECHANISM

(71) Applicant: TEXAS INSTRUMENTS INCORPORATED, Dallas, TX (US)

(72) Inventors: Joerg Kirchner, Mauern (DE); Stefan Schimonsky, Munich (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 73 days.

(21) Appl. No.: 17/184,721

(22) Filed: Feb. 25, 2021

(65) Prior Publication Data

US 2022/0271649 A1 Aug. 25, 2022

(51) Int. Cl.
*H02M 1/36* (2007.01)
*H02M 1/00* (2006.01)
*G05F 1/575* (2006.01)
*G05F 1/46* (2006.01)
*H02M 3/157* (2006.01)
*H02M 3/158* (2006.01)

(52) U.S. Cl.
CPC ............. *H02M 1/36* (2013.01); *G05F 1/575* (2013.01); *H02M 3/157* (2013.01); *H02M 3/158* (2013.01); *H02M 1/0025* (2021.05)

(58) Field of Classification Search
CPC .... H02M 1/36; H02M 1/0025; H02M 1/0058; G05F 1/468
See application file for complete search history.

(56) References Cited

U.S. PATENT DOCUMENTS

| | | | | |
|---|---|---|---|---|
| 6,232,832 | B1* | 5/2001 | Kirkpatrick, II | H03F 3/45475 327/309 |
| 10,459,467 | B1* | 10/2019 | Moon | H02M 3/156 |
| 2006/0284999 | A1* | 12/2006 | Muramatsu | H04N 5/3575 348/E3.018 |
| 2007/0052403 | A1* | 3/2007 | Stoichita | H02M 3/156 323/288 |
| 2009/0027518 | A1* | 1/2009 | Kita | H04N 9/083 348/241 |
| 2009/0039853 | A1* | 2/2009 | Omi | H02M 3/156 323/284 |
| 2012/0206121 | A1* | 8/2012 | Evans | H02M 3/156 323/288 |
| 2013/0265807 | A1* | 10/2013 | Lee | H02M 1/36 363/49 |
| 2018/0006560 | A1* | 1/2018 | Mascioli | H02M 1/36 |

(Continued)

FOREIGN PATENT DOCUMENTS

| | | | | |
|---|---|---|---|---|
| CN | 201349353 Y | * | 11/2009 | |
| CN | 104065353 A | * | 9/2014 | ........... H03F 3/2171 |

(Continued)

*Primary Examiner* — Sisay G Tiku
(74) *Attorney, Agent, or Firm* — Ray A. King; Frank D. Cimino

(57) ABSTRACT

A soft-start circuit includes an error amplifier, a reference voltage ramp circuit, and a minimum current clamp circuit. The error amplifier is configured to generate a difference voltage representing a difference of a feedback voltage and a reference voltage ramp. The reference voltage ramp circuit is configured to generate the reference voltage ramp. The minimum current clamp circuit is configured to clamp an output of the error amplifier to a predetermined minimum voltage.

15 Claims, 5 Drawing Sheets

(56) References Cited

U.S. PATENT DOCUMENTS

| | | | |
|---|---|---|---|
| 2018/0183331 A1* | 6/2018 | Chen .................... | H02M 3/158 |
| 2019/0068055 A1* | 2/2019 | Takada .................. | H02M 1/32 |
| 2019/0146532 A1* | 5/2019 | Ballarin ................ | H05B 45/50 |
| | | | 323/283 |
| 2019/0229612 A1* | 7/2019 | Chen .................... | H02M 3/158 |
| 2020/0091822 A1* | 3/2020 | Ou ...................... | H02M 3/1582 |

FOREIGN PATENT DOCUMENTS

| | | | | |
|---|---|---|---|---|
| CN | 111555603 B | * | 5/2021 | ............ H02M 1/088 |
| CN | 214846431 U | * | 11/2021 | |
| WO | WO-2007080777 A1 | * | 7/2007 | ............. H02M 1/36 |
| WO | WO-2013042281 A1 | * | 3/2013 | ............. G03B 35/08 |

* cited by examiner

SELF-ADJUSTING DC/DC CONVERTER SOFT-START MECHANISM

BACKGROUND

DC-DC converters typically include one or more switches that are selectively actuated to provide a controlled DC output voltage or current based on a received DC input. The output power is regulated by controlling the pulse width or on time of the signals provided to the converter switch or switches according to an error signal representing the difference between the actual output voltage or current and a desired value. A capacitor is typically connected at the converter output in parallel with a driven load in order to stabilize the converter output voltage and provide a source for load current. At power up, however, the output capacitor is initially discharged, and the difference between the output voltage and the desired value may be large, causing the DC-DC converter to provide large amounts of current to the output. The output capacitor may therefore experience high levels of inrush current during startup. A DC-DC converter may include soft-start circuitry to limit the amount of inrush current provided to the output capacitor during startup.

SUMMARY

In one example, a soft-start circuit includes an error amplifier, a reference voltage ramp circuit, and a minimum current clamp circuit. The error amplifier includes a first input, a second input, and an output. The reference voltage ramp circuit includes an input coupled to the first input of the error amplifier, and an output coupled to the second input of the error amplifier. The minimum current clamp circuit includes an input coupled to the output of the error amplifier, and an output coupled to the output of the error amplifier.

In another example, a soft-start circuit includes an error amplifier, a reference voltage ramp circuit, and a minimum current clamp circuit. The error amplifier is configured to generate a difference voltage representing a difference of a feedback voltage and a reference voltage ramp. The reference voltage ramp circuit is configured to generate the reference voltage ramp. The minimum current clamp circuit is configured to clamp an output of the error amplifier to a predetermined minimum voltage.

In a further example, a DC-DC converter circuit includes a voltage divider, an error amplifier, a reference voltage ramp circuit, and a minimum current clamp circuit. The voltage divider includes an input, and an output. The error amplifier includes a first input coupled to the output of the voltage divider, a second input, and an output. The reference voltage ramp circuit includes an input coupled to the output of the voltage divider, and an output coupled to the second input of the error amplifier. The minimum current clamp includes an input coupled to the output of the error amplifier, and an output coupled to the output of the error amplifier.

DETAILED DESCRIPTION

DC-DC converters may experience a variety of start up issues. Some DC-DC converters clamp the maximum inrush current by limiting the error amplifier output voltage with a ramp. With this clamping solution, the initial inrush current is small, slowly ramps up, and before reaching the desired output voltage the inrush current may be too high and the DC-DC converter can go into current limit. DC-DC converters may also implement soft-start by generating a reference voltage ramp and ramping output voltage with the reference voltage ramp. With the reference voltage ramp, the inrush current and ramp time can be selected for a maximum value of output capacitance or load current. However, the start-up time is inflexible and may be too long to meet system power up timing requirements.

The soft-start circuit described herein provides a reduced start up time with a controlled and limited inrush current. The soft-start circuit allows safe start up within a given time for large output capacitors or large load currents. The soft start circuit includes a minimum current clamp circuit that limits inrush current and provides quick startup, and a voltage reference ramp circuit that controls inrush current if the inrush current limit of the minimum current clamp circuit is too low. The minimum current clamp circuit and the voltage reference ramp circuit operate simultaneously during soft-start, and control may be smoothly and seamlessly transferred from one circuit to the other as needed to satisfy changing load current requirements.

Figure 1:
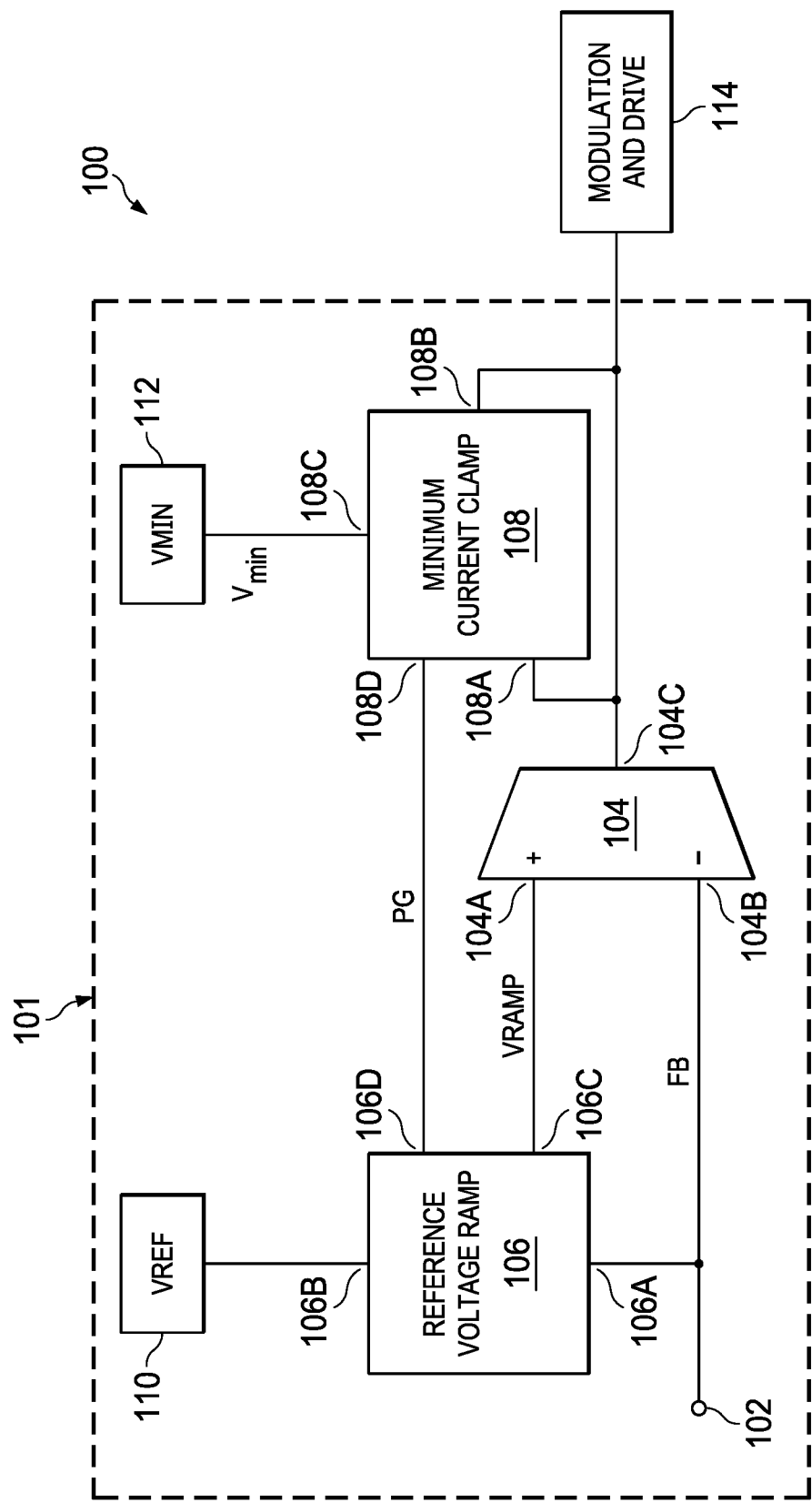
FIG. 1 is a block diagram of an example DC-DC converter that includes a soft-start circuit as described herein.

FIG. 1 is a block diagram for an example DC-DC converter 100. The DC-DC converter 100 includes a soft-start circuit 101, and modulation and drive circuitry 114. The modulation and drive circuitry 114 includes switches and control circuitry that opens and closes the switches to charge and discharge an inductor and produce a desired output voltage. The soft-start circuit 101 controls the modulation and drive circuitry 114 during start up of the DC-DC converter 100 to ramp up output voltage quickly and safely.

The soft-start circuit 101 includes a feedback terminal 102, an error amplifier 104, a reference voltage ramp circuit 106, a minimum current clamp circuit 108, a reference voltage source 110, and a minimum voltage source 112. The feedback terminal 102 provides feedback voltage from an output of the DC-DC converter 100, and is coupled to an input 104B of the error amplifier 104 and an input 106A of the reference voltage ramp circuit 106. The error amplifier 104 generates, at its output 104C, a difference voltage as the difference of the feedback voltage and a reference voltage ramp (VRAMP) provided at the input 104A of the error amplifier 104. The error amplifier 104 generates the difference voltage during soft-start and during normal operation of the 100 to regulate output voltage.

The reference voltage ramp circuit 106 generates the reference voltage ramp provided at the input 104A of the error amplifier 104. During soft-start, the reference voltage ramp transitions at a predetermined rate from a minimum voltage (e.g., zero volts) to a reference voltage (VREF) generated by the reference voltage source 110. When soft-start is complete, the reference voltage ramp (VRAMP)

remains at VREF. An input 106A of the reference voltage ramp circuit 106 is coupled to the feedback terminal 102. If the feedback voltage derived from the output voltage of the DC-DC converter 100 increases more quickly than the reference voltage ramp (e.g., the output of the DC-DC converter 100 is lightly loaded), then when the feedback voltage is equal to a predetermined percentage (e.g., 95%) of the reference voltage, the reference voltage ramp circuit 106 increases the voltage of the reference voltage ramp to equal the predetermined percentage of the reference voltage. After the reference voltage ramp is stepped up the predetermined percentage of the reference voltage, the reference voltage ramp continues to increase until equal to the reference voltage, and the output voltage of the DC-DC converter 100 ramps to the desired voltage at the rate of change of the reference voltage ramp. If the feedback voltage increases more slowly than the reference voltage ramp, then the timing of the reference voltage ramp controls the rise of the output voltage.

The reference voltage ramp circuit 106 also activates a power good signal (PG) at output 106D when the feedback voltage is equal to a predetermined percentage (e.g., 95%) of the reference voltage. The power good signal is provided to the minimum current clamp circuit 108.

The minimum current clamp circuit 108 is coupled to the error amplifier 104 and the reference voltage ramp circuit 106, and clamps the output of the error amplifier 104 to a minimum voltage that sets the inrush current at the initiation of soft-start. The minimum voltage is set by the minimum voltage source 112. An input 108C of the minimum current clamp circuit 108 is coupled to the minimum voltage source 112. When the difference voltage generated by the error amplifier 104 is less than the minimum voltage, the minimum current clamp circuit 108 pulls the output 104C of the error amplifier 104 up to the minimum voltage, and sets the minimum current generated by the DC-DC converter 100 to quickly charge output capacitance and any load circuit coupled to the DC-DC converter 100. An input 108A and an output 108B of the minimum current clamp circuit 108 are coupled to the output 104C of the error amplifier 104. The minimum current clamp circuit 108 is active when then power good signal generated by the reference voltage ramp circuit 106 is inactive. Input 108D of the minimum current clamp circuit is coupled to the output 106D of the reference voltage ramp circuit 106 for receipt of the power good signal. The minimum current clamp circuit 108 and circuitry of the reference voltage ramp circuit 106 providing ramp functionality may be disabled when soft-start is complete.

Figure 2:
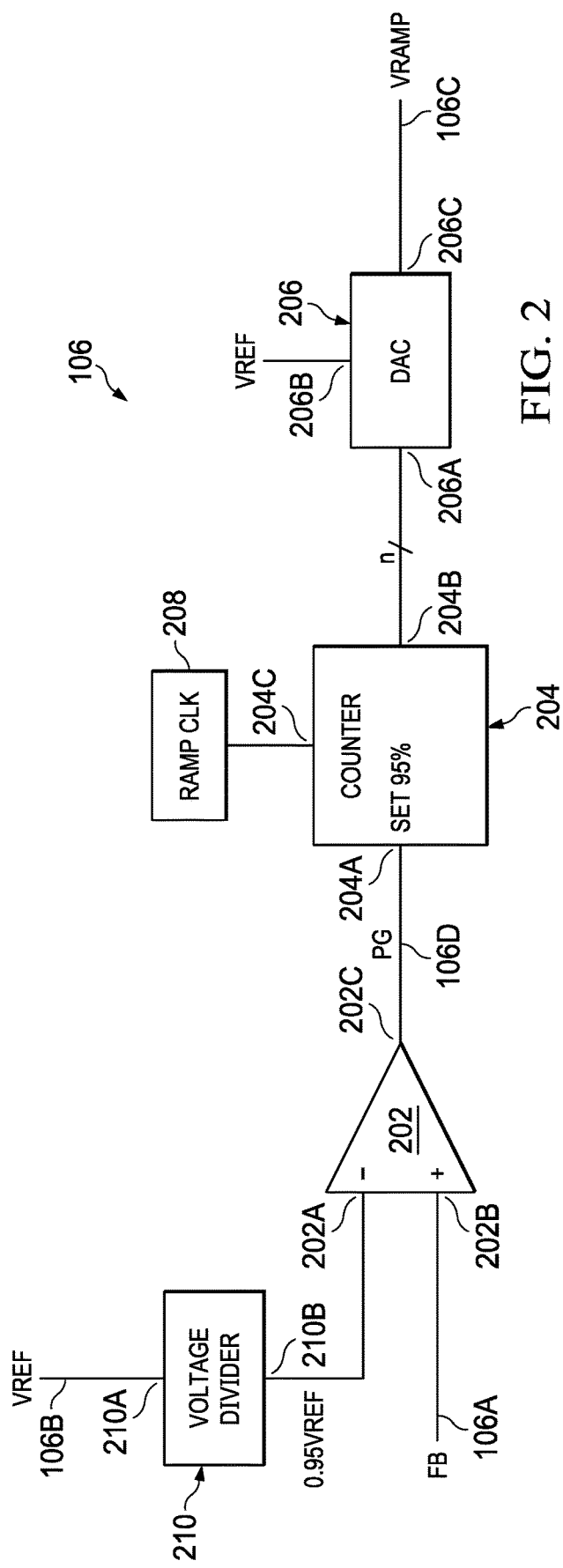
FIG. 2 is a block diagram of a reference voltage ramp circuit suitable for use in the soft-start circuit of FIG. 1.

FIG. 2 is a block diagram for an example reference voltage ramp circuit 106. The reference voltage ramp circuit 106 includes a comparator 202, a counter 204, a digital-to-analog converter (DAC) 206, a ramp clock 208, and a voltage divider 210. The voltage divider 210 includes an input 210A coupled to the input 106B of the reference voltage ramp circuit 106 and reference voltage source 110 for receipt of the reference voltage. The voltage divider 210 divides the reference voltage by a predetermined divisor (e.g., 1/0.95) to produce a threshold voltage for comparison to the feedback voltage.

The comparator 202 compares the feedback voltage to the threshold voltage. An input 202A of the comparator 202 is coupled to the output 210G of the voltage divider 210 for receipt of the threshold voltage. An input 202B of the comparator 202 is coupled to the input 106A of the reference voltage ramp circuit 106 and the feedback terminal 102 for receipt of the feedback voltage. When the feedback voltage exceeds the threshold voltage, the output signal (PG) generated by the comparator 202 changes state. The output signal of the comparator 202 is provided to the counter 204. The output 202C of the comparator 202 is coupled to the preset input 204A of the counter 204 and the output 106D of the reference voltage ramp circuit 106.

The counter 204 is incremented to a predetermined maximum count value by a clock signal generated by the ramp clock 208. The clock signal controls the rate of change of the reference voltage ramp. A clock input 204C of the counter 204 is coupled to the ramp clock 208 for receipt of the clock signal. The counter 204 includes a preset input 204A that is coupled to the output 202C of the comparator 202. When the power good signal (PG) generated by the comparator 202 changes state based on the feedback signal exceeding the threshold voltage, the counter 204 is preset to a value corresponding to the threshold voltage (the predetermined percentage of the reference voltage). The counter output value is provided to the DAC 206.

The DAC 206 includes a code input 206A coupled to the count output 204B of the counter 204. The DAC 206 converts the count value output by the counter 204 to the reference voltage ramp (VRAMP). The output 206C of the DAC 206 is coupled to the output 106C and the input 104A of the error amplifier 104. A reference voltage input 206B of the DAC 206 is coupled to the reference voltage source 110.

Another implementation of the reference voltage ramp circuit 106 uses a current source to charge a capacitor (rather than the counter 204 and DAC 206) to ramp up the reference voltage. When the power good signal is activated by the comparator 202, the reference voltage ramp may be stepped up the threshold voltage by switching a second capacitor that is precharged to the threshold voltage onto the reference voltage ramp. The second capacitor may thereafter be charged by the current source to continue ramping of the reference voltage.

Figure 3:
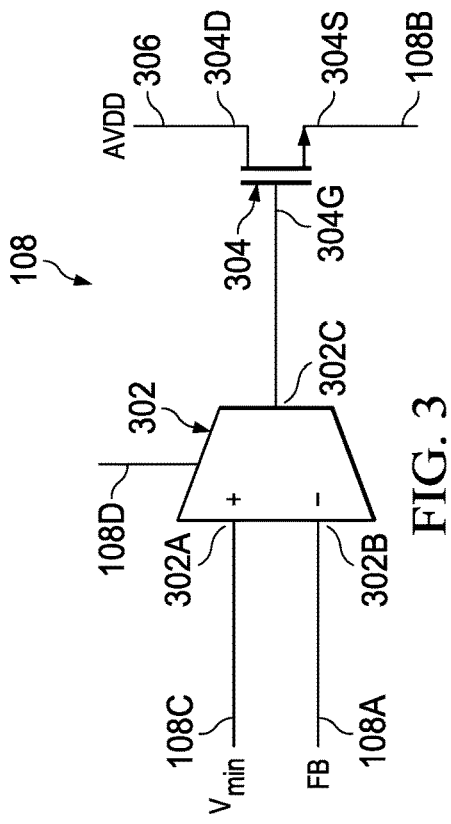
FIG. 3 is a block diagram of a minimum current clamp circuit suitable for use in the soft-start circuit of FIG. 1.

FIG. 3 is a block diagram for an example minimum current clamp circuit 108. The minimum current clamp circuit 108 includes an amplifier 302 (clamp amplifier) and a transistor 304. The transistor 304 may be an n-type field effect transistor. The amplifier 302 compares the voltage received at the input 108A to the minimum voltage provided by the minimum voltage source 112, and generates a difference voltage to control the transistor 304. The output of the amplifier 302 activates the transistor 304 to source current to the output 108B and pull the output 108B to a minimum voltage value that corresponds to a minimum current output of the DC-DC converter 100.

An input 302A of the amplifier 302 is coupled to the input 108C and the minimum voltage source 112. An input 302B of the amplifier 302 is coupled to the input 108A of the minimum current clamp circuit 108 and the output 104C of the error amplifier 104. The output 302C of the amplifier 302 is coupled to a gate terminal 304G (a control terminal) of the transistor 304. A drain 304D (a current terminal) of the transistor 304 is coupled to a power supply terminal 306. A source terminal 304S (a current terminal) of the transistor 304 is coupled to the output 108B of the minimum current clamp circuit 108 and the output 104C of the error amplifier 104.

The minimum current clamp circuit 108 is disabled when the feedback voltage exceeds the threshold voltage applied at the input 202A of the comparator 202. In one implementation of the minimum current clamp circuit 108, the amplifier 302 includes an input 302D that is coupled to the input 108D of the minimum current clamp circuit 108. When the power good signal received at the input 108D is active, the output of amplifier 302 is deactivated to turn off the transistor 304. In another implementation, the drain 304D of the transistor 304 is disconnected from the power supply terminal 306 (e.g., by a switch) when the power good signal is inactive.

Figure 4:
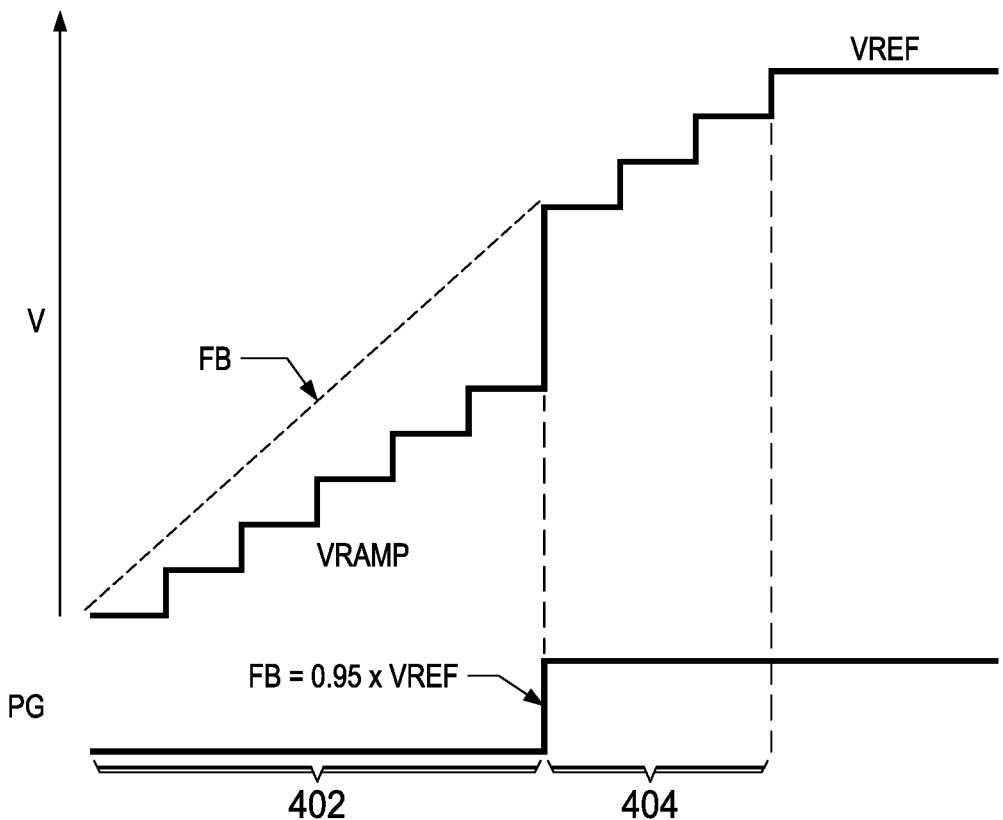
FIG. 4 is a graph of signals in the soft-start circuit of FIG. 1.

FIG. 4 is a graph of signals in the soft-start circuit 101. In the interval 402, the feedback voltage (FB) and the voltage of the reference voltage ramp (VRAMP) are increasing. The rate of increase of the feedback voltage is determined by the minimum current set by the minimum current clamp circuit 108, the output capacitance of the DC-DC converter 100, and the load coupled to the DC-DC converter 100. In FIG., 4, the feedback voltage is increasing faster than the reference voltage ramp. When the feedback voltage is equal to a predetermined percentage (e.g., 95%) of the reference voltage, the reference voltage ramp increases (in a step) to the predetermined percentage of the reference voltage. In interval 404, the reference voltage ramp continues to rise to the reference voltage to bring the output voltage of the DC-DC converter 100 to the desired value at a controlled rate.

Figure 5:
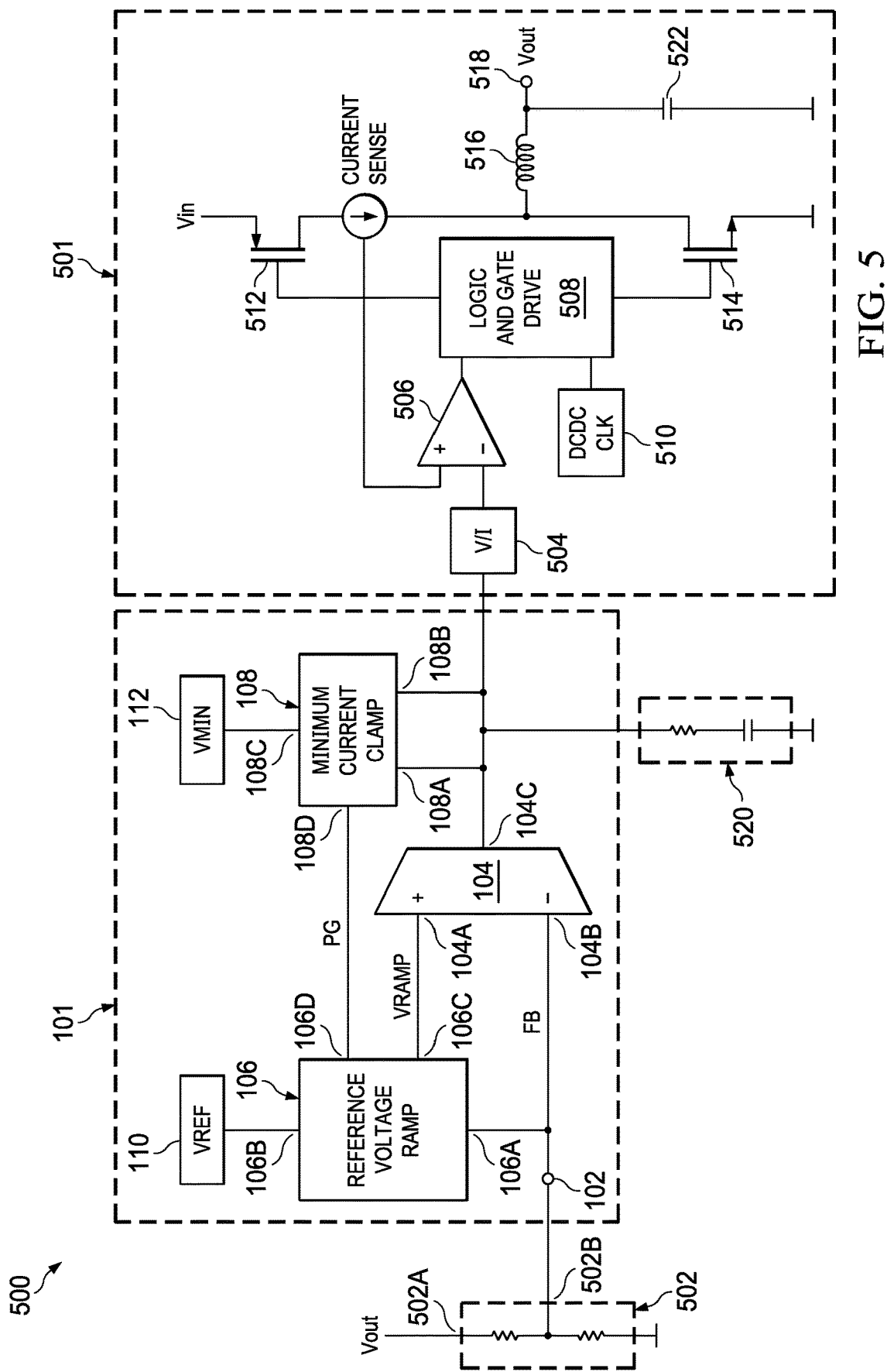
FIG. 5 is a block diagram of a buck converter that includes the soft-start circuit of FIG. 1.

FIG. 5 is a block diagram for a buck converter 500. The buck converter 500 includes modulation and drive circuitry 501, a voltage divider 502, and the soft-start circuit 101. The modulation and drive circuitry 501 is an implementation of the modulation and drive circuitry 114. The modulation and drive circuitry 501 includes a voltage-to-current conversion circuit 504, a comparator 506, logic and gate drive circuitry 508, a DCDC clock circuit 510, a high-side transistor 512, a low-side transistor 514, an inductor 516, an output terminal 518, and an output capacitor 522.

The voltage-to-current conversion circuit 504 is coupled the soft-start circuit 101, and converts voltage at the output 104C of the error amplifier 104 to a current. A compensation network 520 is coupled to the output 104C of the error amplifier 104 to stabilize the buck converter 500.

The comparator 506 compares the difference current produced by the voltage-to-current conversion circuit 504 to an inductor charging current flowing through the high-side transistor 512. In some implementations of the modulation and drive circuitry 501, the comparator 506 may compare the difference voltage at the output 104C of the error amplifier 104 to a voltage representing the current flowing through the high-side transistor 512. When the inductor charging current exceeds the difference current, the output of the comparator 506 changes state. Responsive to the state change at the output of the comparator 506, the logic and gate drive circuitry 508 turns off the high-side transistor 512 and turns on the low-side transistor 514 to initiate discharge of the inductor 516.

The DCDC clock circuit 510 generates a clock signal that triggers the logic and gate drive circuitry 508 to turn on the high-side transistor 512 and turn off the low-side transistor 514 to initiate charging of the inductor 516.

The output terminal 518 is coupled to the inductor 516 and the output capacitor 522 to provide the output voltage to a load circuit. The voltage divider 502 is coupled to the output terminal 518. The voltage divider 502 divides the output voltage for comparison to the reference voltage ramp (VRAMP) by the error amplifier 104. The voltage divider 502 includes an input 502A coupled to the output terminal 518 and an output 502B coupled to the feedback terminal 102.

The buck converter 500 is provided as an example of application of the soft-start circuit 101. Implementations of the soft-start circuit 101 may also be applied to control soft-start in boost and buck-boost converters, single-ended primary-inductor converters (SEPIC), Ćuk converters, low-dropout (LDO) linear regulators, or other types of switch-mode or linear regulators. .

Figure 6:
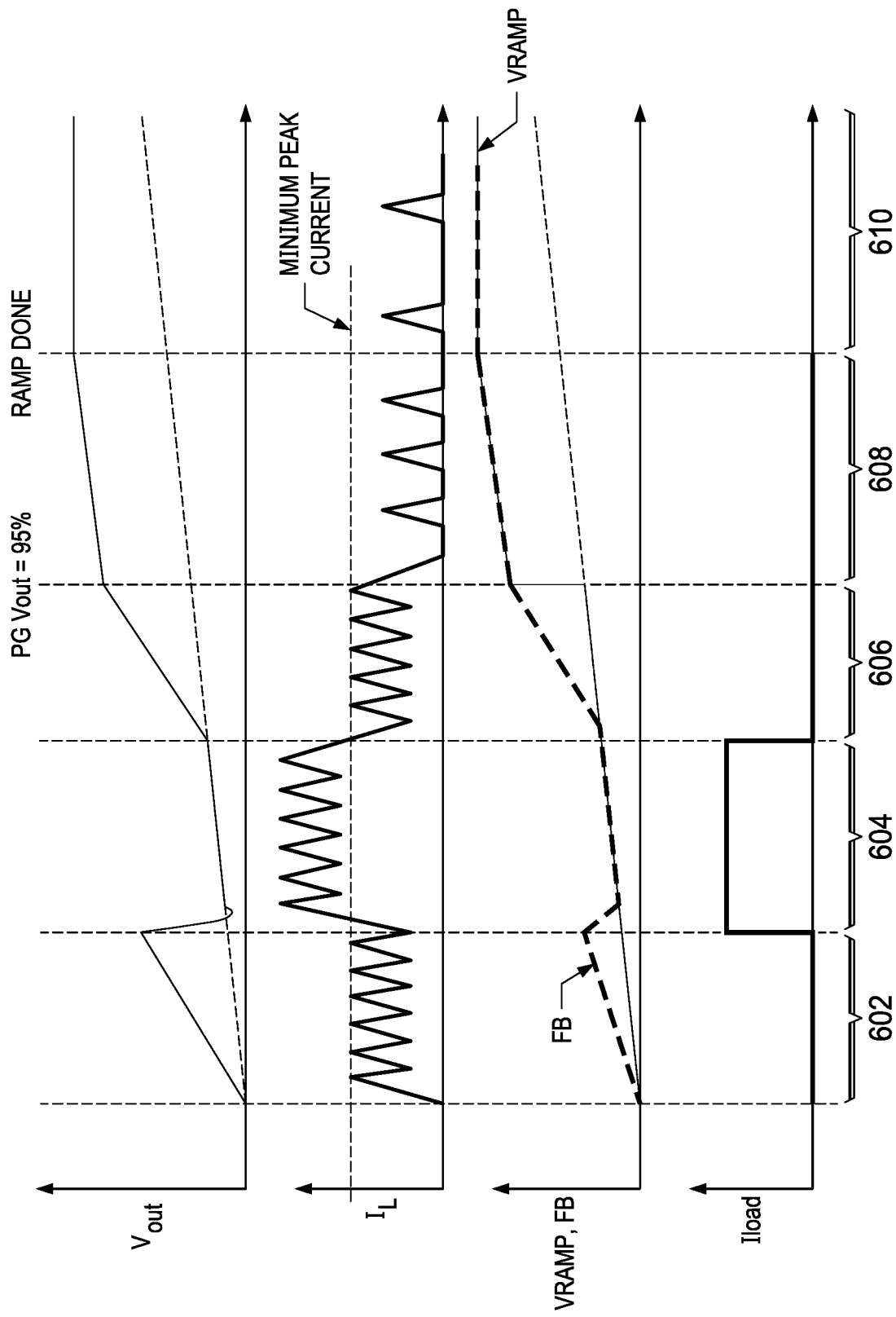
FIG. 6 is a graph of signals in the buck converter of FIG. 5 during soft-start operation.

FIG. 6 is a graph of signals in the buck converter 500. In FIG. 6, soft-start of the buck converter 500 is shown in intervals 602-608, and steady state operation is shown in interval 610. In the interval 602, load current (Iload) is relatively low, and the minimum current clamp circuit 108 is clamping the difference voltage (COMP) to the minimum voltage generated by the minimum voltage source 112. This causes the modulation and drive circuitry 501 to produce a minimum peak current ($I_L$) in the inductor 516 (average current or valley current may be used in place of peak current) for charging the output capacitor 522 and ramping up the output voltage (Vout) at the output terminal 518. In the illustration of FIG. 6, application of the minimum peak current to charge the output capacitor 522 causes the feedback voltage (the output voltage divided by the voltage divider 502) to rise more quickly than the reference voltage ramp.

In interval 604, the load current increases and the reference voltage ramp (VRAMP) limits current $I_L$ in the inductor 516 (by limiting the reference voltage provided to the error amplifier 104). Thus, when load current increases, control of soft-start automatically shifts from the minimum current clamp circuit 108 to the reference voltage ramp circuit 106. The error amplifier 104 takes over regulation and increases the inductor current to a value greater than that allowed by the minimum current clamp circuit 108 so the output voltage can follow the reference ramp. Because the reference voltage ramp is controlling soft-start, the feedback voltage increases at the rate of the reference voltage ramp.

In interval 606, the load current decreases and control of soft-start seamlessly reverts back to the minimum current clamp circuit 108. The inductor current exceeds the load current and the feedback voltage rises more quickly than the reference voltage ramp.

At the end of the interval 606, the feedback voltage exceeds the predetermined percentage of the reference voltage (exceeds 95% of the reference voltage), the voltage of the reference voltage ramp is increased to the predetermined percentage of the reference voltage, and the minimum current clamp circuit 108 is disabled.

In the interval 608, the minimum current clamp circuit 108 is disabled, and the difference voltage generated by the error amplifier 104 controls the switching of the high-side transistor 512 and the low-side transistor 514. The output voltage (and the feedback voltage) follow the reference voltage ramp and the output voltage slowly rises to the desired value. At the end of the interval 608, the output voltage has risen to the desired voltage. In the interval 610, the modulation and drive circuitry 501 maintains the output voltage at the desired value based on the difference voltage output by the error amplifier 104.

Thus, in the buck converter 500, the soft-start circuit 101 automatically applies the minimum current clamp circuit 108 to quickly ramp up the output voltage to a predetermined percentage when load current is low, and applies the reference voltage ramp circuit 106 when the load current is high to limit in-rush current. After reaching the predetermined percentage of the desired output voltage, the reference voltage ramp circuit 106 slowly ramps the output voltage to the desired value.

Figure 7:
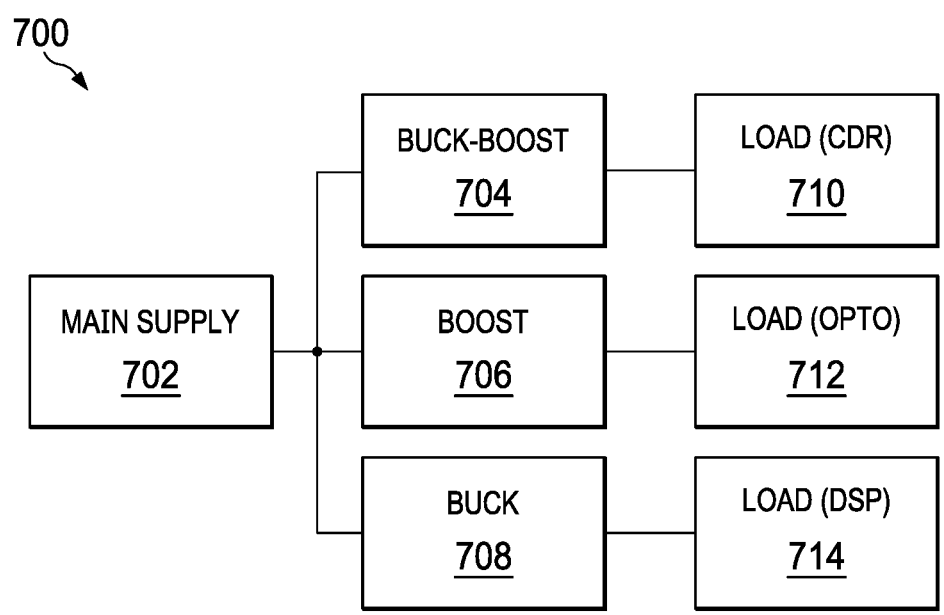
FIG. 7 is a block diagram of system that include DC-DC converters incorporating the soft-start circuit described herein.

FIG. 7 is a block diagram for system 700 that includes DC-DC converters incorporating the soft-start circuit 101. The system 700 includes a main power supply 702, a buck-boost converter 704, a boost converter 706, and a buck converter 708. The buck converter 708 may be an implementation of the buck converter 500. The buck-boost converter 704, the boost converter 706, and the buck converter 708 are coupled to and powered by the main power supply 702. The buck-boost converter 704 powers a load 710. The load 710 may be a clock-data recovery circuit or other circuit. The boost converter 706 powers a load 712. The load 712 may be an optical receiver circuit or other circuit. The buck converter 708 powers a load circuit 714. The load circuit 714 may be a digital signal processor circuit or other circuit. Each of the buck-boost converter 704, the boost converter 706, and the buck converter 708 may include an implementation of the soft-start circuit 101 to control soft-start operation.

Some implementations of the system 700 may include other converter topologies (SEPIC, Ćuk, LDO, etc.) that include an implementation of the soft-start circuit 101.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A soft-start circuit, comprising:
an error amplifier having first and second error inputs and an error output;
a reference voltage ramp circuit having a ramp input and a ramp output, wherein the ramp input is coupled to the first error input, the ramp output is coupled to the second error input, and the reference voltage ramp circuit includes:
a digital-to-analog converter (DAC) having a reference voltage input, a code input and a reference voltage output, wherein the reference voltage input is coupled to a reference voltage terminal, and the reference voltage output is coupled to the second error input
a counter having a preset input and a count output, wherein the count output is coupled to the code input and
a comparator having first and second comparator inputs and a comparator output, wherein the first comparator input is coupled to the first error input, and the comparator output is coupled to the preset input and
a minimum current clamp circuit having a clamp input and a clamp output, wherein the clamp input is coupled to the error output, and the clamp output is coupled to the error output.

2. The soft-start circuit of claim 1, wherein the reference voltage ramp circuit includes a voltage divider coupled between the reference voltage terminal and the second comparator input.

3. The soft-start circuit of claim 1, wherein the minimum current clamp circuit includes:
a clamp amplifier having first and second clamp inputs and a clamp output, wherein the first clamp input is coupled to the error output, and the second clamp input is coupled to a minimum voltage terminal; and
a transistor having first and second current terminals and a control terminal, wherein the first current terminal is coupled to a power supply terminal, the second current terminal is coupled to the error output, and the control terminal is coupled to the clamp output.

4. A soft-start circuit, comprising:
an error amplifier configured to generate a difference voltage representing a difference of a feedback voltage and a reference voltage ramp;
a reference voltage ramp circuit configured to generate the reference voltage ramp; and
a minimum current clamp circuit configured to clamp an output of the error amplifier to a predetermined minimum voltage, the minimum current clamp circuit including:
an amplifier configured to compare an output voltage of the error amplifier to the predetermined minimum voltage; and
a transistor configured to source a current to pull the output voltage of the error amplifier to the predetermined minimum voltage.

5. The soft-start circuit of claim 4, wherein the reference voltage ramp circuit includes a comparator configured to compare the feedback voltage to a percentage of a reference voltage.

6. The soft-start circuit of claim 5, wherein the reference voltage ramp circuit includes a voltage divider configured to divide the reference voltage by a divisor to produce the percentage of the reference voltage.

7. The soft-start circuit of claim 6, wherein the divisor is 1/0.95.

8. The soft-start circuit of claim 6, wherein the reference voltage ramp circuit includes a counter configured to increment an output count value to a maximum count value.

9. The soft-start circuit of claim 8, wherein the reference voltage ramp circuit includes a digital-to-analog converter (DAC) configured to convert the output count value to the reference voltage ramp.

10. The soft-start circuit of claim 8, wherein the counter is configured to preset the output count value to a percentage of the maximum count value responsive to a signal from the comparator indicating that the feedback voltage exceeds the percentage of the reference voltage.

11. The soft-start circuit of claim 10, wherein the percentage of the maximum count value is 95 percent of the maximum count value.

12. A DC-DC converter circuit, comprising:
a voltage divider having a voltage divider input and a voltage divider output
an error amplifier having first and second error inputs and an error output, wherein the first error input is coupled to the voltage divider output
a reference voltage ramp circuit having a ramp circuit input and a ramp circuit output, wherein the ramp circuit input is coupled to the voltage divider output, the ramp circuit output is coupled to the second error input, and the reference voltage ramp circuit includes:
a digital-to-analog converter (DAC) having a reference voltage input, a code input and a DAC output, wherein the reference voltage input is coupled to a reference voltage terminal, and the DAC output is coupled to the second error input;
a counter having a preset input and a count output, wherein the count output is coupled to the code input and a comparator having first and second comparator inputs and a comparator output, wherein the first comparator input is coupled to the voltage divider output, and the comparator output is coupled to the preset input; and a minimum current clamp circuit having a clamp input and a clamp output, wherein the clamp input is coupled to the error output, and the clamp output is coupled to the error output.

13. The DC-DC converter circuit of claim 12, wherein the comparator is configured to:

compare a feedback voltage at the voltage divider output to a percentage of a reference voltage at a reference voltage terminal; and set a count value to be generated by the counter, the count value being a percentage of a maximum count value responsive to the feedback voltage exceeding the percentage of the reference voltage.

14. The DC-DC converter circuit of claim 12, wherein:

the voltage divider is a first voltage divider; and the reference voltage ramp circuit further includes a second voltage divider having a second voltage divider input and a second voltage divider output, wherein the second voltage divider input is coupled to the reference voltage terminal, and the second voltage divider output is coupled to the second comparator input.

15. The DC-DC converter circuit of claim 12, wherein the minimum current clamp circuit includes:

a clamp amplifier having first and second clamp inputs and a clamp output, wherein the first clamp input is coupled to the error output, and the second clamp input is coupled to a minimum voltage terminal; and a transistor having first and second current terminals and a control terminal, wherein the first current terminal is coupled to a power supply terminal, the second current terminal is coupled to the error output, and the control terminal is coupled to the clamp output.

* * * * *